(12) United States Patent
Hecker et al.

(10) Patent No.: US 7,633,622 B2
(45) Date of Patent: Dec. 15, 2009

(54) METHOD FOR ANALYZING A SAMPLE AND MICROSCOPE FOR EVANESCENTLY ILLUMINATING THE SAMPLE

(75) Inventors: Andreas Hecker, Asslar (DE); Heinrich Ulrich, Heidelberg (DE); Werner Knebel, Kronau (DE); Kyra Moellmann, Trippstadt (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 215 days.

(21) Appl. No.: 11/414,905

(22) Filed: May 1, 2006

(65) Prior Publication Data

US 2008/0151226 A1    Jun. 26, 2008

Related U.S. Application Data

(63) Continuation of application No. PCT/EP2004/052273, filed on Sep. 22, 2004.

(30) Foreign Application Priority Data

Sep. 25, 2003 (DE) ................ 103 44 410
Sep. 10, 2004 (DE) .......... 10 2004 044 311

(51) Int. Cl.
    *G01N 21/55* (2006.01)
(52) U.S. Cl. ...................... 356/445; 356/318
(58) Field of Classification Search ............... 356/318, 356/445–448, 73; 359/368, 385, 387–390
    See application file for complete search history.

(56) References Cited

U.S. PATENT DOCUMENTS 4,681,451 A * 7/1987 Guerra et al. ............... 356/600
6,504,653 B2   1/2003 Matthae et al.
6,552,556 B1 * 4/2003 Miki ........................... 324/754
6,987,609 B2 * 1/2006 Tischer et al. ............... 359/385

(Continued)

FOREIGN PATENT DOCUMENTS

DE    101 08 796 A1    9/2002

(Continued)

OTHER PUBLICATIONS

Oheim, M. et al. Multiparameter evanescent-wave imaging in biological fluorescence microscopy, IEEE J. of Quantum Electronics, Feb. 2002, p. 142-148, v.38, n.2, IEEE Inc., NY, USA.

(Continued)

*Primary Examiner*—Hoa Q Pham
(74) *Attorney, Agent, or Firm*—Houston Eliseeva LLP

(57) ABSTRACT

A microscope with evanescent sample illumination and a method for testing samples are disclosed. A first evanescent field, which exhibits a first penetration depth in the sample, and a second evanescent field, which exhibits a second penetration depth in the sample that is greater than the first penetration depth, are produced. A detector is provided that detects the first detection light, which exits from the part of the sample illuminated with the first evanescent field, and which produces first detection light data therefrom, and the second detection light, which exits from the part of the sample illuminated with the second evanescent field, and which produces second detection light data therefrom. Furthermore, a processing module is provided for processing the first and second detection light data.

20 Claims, 3 Drawing Sheets

U.S. PATENT DOCUMENTS

| | | | |
|---|---|---|---|
| 7,042,638 B2 | 5/2006 | Gonschor et al. | |
| 2002/0097489 A1 | 7/2002 | Kawano et al. | |
| 2003/0197120 A1* | 10/2003 | Miyamoto | 250/234 |
| 2003/0205681 A1* | 11/2003 | Modlin | 250/458.1 |
| 2004/0001253 A1 | 1/2004 | Abe et al. | |
| 2004/0174523 A1* | 9/2004 | Uhl et al. | 356/318 |
| 2006/0157637 A1* | 7/2006 | Karasawa et al. | 250/201.7 |
| 2006/0245047 A1* | 11/2006 | Hecker et al. | 359/368 |
| 2006/0250689 A1* | 11/2006 | Ulrich et al. | 359/385 |
| 2006/0250690 A1* | 11/2006 | Ulrich et al. | 359/385 |
| 2007/0159690 A1* | 7/2007 | Ulrich et al. | 359/385 |

FOREIGN PATENT DOCUMENTS

| | | |
|---|---|---|
| DE | 101 43 481 A2 | 3/2003 |
| DE | 102 17 098 A1 | 11/2003 |
| DE | 102 29 935 A1 | 1/2004 |

OTHER PUBLICATIONS

Rohrbach, A. Observing Secretory Granules with a Mulitangle Evanescent Wave Microscope. Biophysical J., May 2000, p. 2641-2654, v.78, n.5, The Biophysical Society, MD, USA.

Sund, S. E. et al. Cell Membrane Orientation Visualized by Polarized Total Internal Reflection . . . Biophysical J., Oct. 1999, p. 2266-2283, v.77, The Biophysical Society, MD, USA.

* cited by examiner

METHOD FOR ANALYZING A SAMPLE AND MICROSCOPE FOR EVANESCENTLY ILLUMINATING THE SAMPLE

RELATED APPLICATIONS

This application is a Continuation of PCT application serial number PCT/EP2004/052273 filed on Sep. 22, 2004, which in turn claims priority to German Patent Application No. 103 44 410.6. filed on Sep. 25, 2003, and German Patent Application No. 10 2004 044 311.4, filed on Sep. 10, 2004, all of which are incorporated herein by reference in their entirety.

FIELD OF THE INVENTION

The invention relates to a method for the microscopic testing of a sample.

The invention further relates to a microscope with evanescent sample illumination.

BACKGROUND OF THE INVENTION

A microscope with evanescent illumination of a sample is known from US 2002/0097489 A1. The microscope comprises a white light source, the light of which is coupled for the purpose of evanescent illumination via a slit aperture through the microscope objective onto a sample holder, which holds a sample. The illumination light propagates itself in the sample holder by means of total internal reflection, whereby the illumination of the sample occurs only in the region of the evanescent field that protrudes from the sample holder. Microscopes of this type are known as "total internal reflection fluorescent microscopes" (TIRFM).

The z-resolution of TIRF microscopes is extraordinarily good because the evanescent field protrudes only about 100 nm into the sample.

A high-aperture objective specifically for TIRF application is known from DE 101 08 796 A1. The objective comprises a first lens with positive refractive power and a second lens with negative refractive power, whereby the focal distance ratio between the two lenses is in the −0.4 and −0.1 range, and the total refractive power is greater than zero. The objective further comprises two positive lenses, the diameter ratio to focal length of which is greater than 0.3 and less than 0.6. The objective further comprises a negative lens and a collecting lens, whereby the negative lens faces the front group, and the focal distance ratio of the negative lens to the collector lens is between −0.5 and −2.

An incident illumination device for TIRF microscopy is known from DE 102 17 098 A1. The incident illumination device comprises an illumination source that emits a polarized illumination beam when in operation, which propagates at an angle to the optical axis and a deflector that deflects the illumination light beam and couples it parallel to the optical axis in the objective. Provision is made in this incident illumination device for the illumination light beam emitted by the illumination source to exhibit a phase difference in the s- and p-polarization directions, and for the deflection arrangement to reflect the illumination light beam x times, whereby $x=(n\times 180°-d)/60°$.

A microscope for total internal reflection microscopy (TIRM) is known from DE 101 43 481 A1. The microscope exhibits a microscope housing and an objective. The illumination light emitted by an illumination device can be coupled via an adapter that can be inserted into the microscope housing.

A microscope with an optical illumination system that enables simple switching between evanescent illumination and reflective illumination is known from US 2004/0001253 A1. The illumination system comprises a laser light source, the light of which is coupled in an optical fiber. Furthermore, an outcoupling optic is provided that focuses the light that exits from the fiber onto a rear focal point of the microscope objective. The optical fiber is movable along a plane that is perpendicular to the optical axis of the microscope objective.

A device for coupling light in a microscope is known from DE 102 29 935 A1. Here, a laser light is directed onto a sample in the illuminated field diaphragm plane by a laser light fiber coupling, which is implemented as a slide. The invention is particularly suitable for the TIRF method.

The technologies for evanescent sample illumination known to date merely enable the testing of sample layers that directly adjoin the cover glass or the sample holder.

SUMMARY OF THE INVENTION

The task of the present invention is to disclose a method for microscopically testing a sample under evanescent sample illumination that is not limited to sample layers that directly adjoin the cover glass or the sample holder, and which additionally enables 3-D testing of the sample.

This task is solved by a method comprising the following steps:
  Illumination of the sample with a first evanescent field, whereby the first evanescent field exhibits a first penetration depth of the sample;
  Detection of the first detection light that exits from the part of the sample that is illuminated with the first evanescent field, and production of first detection light data;
  Illumination of the sample with a second evanescent field, whereby the second evanescent field exhibits a second penetration depth of the sample that is greater than the first penetration depth;
  Detection of the second detection light that exits from the part of the sample that is illuminated with the second evanescent field, and production of second detection light data; and
  Processing of the first and second detection light data.

A further task of the present invention is to disclose a microscope that enables 3-D testing of a sample under evanescent sample illumination.

This further task is solved by a microscope wherein are produced a first evanescent field that exhibits a first penetration depth of the sample and a second evanescent field that exhibits a second penetration of the field that is greater than the first penetration depth; and wherein at least one detector is provided that detects the first detection light that exits from the part of the sample illuminated with the first evanescent field, and which produces first detection light data therefrom, and the second detection light that exits from the part of the sample illuminated with the second evanescent field, and which produces second detection light data therefrom; and wherein is provided a processing module for processing the first and second detection light data.

The method according to the invention preferably comprises the further steps for illuminating the sample with one or several further evanescent fields of various penetration depth, and for detection of the further detection light that exits from the part or parts of the sample illuminated by the evanescent field or the further evanescent field, and the production of further detection light data. Processing then preferably comprises the first, second, and further detection light data. Three-dimensional testing of the sample is consequently enabled, according to the invention, by sequentially changing the penetration depth of the illumination light.

Additional sample layers are acquired by sequentially increasing the penetration depth. Precise correlation of the individual pixels and/or image objects with layer depths may be achieved by "subtracting" the image data of the previous data set, which were acquired at a lower penetration depth, from the data acquired for each additional sample layer.

The first and second detection light data, according to the invention, comprise data of image objects and/or parts of image objects. Processing preferably comprises a correlation of image objects with various layer depths (e.g., 20 nm-40 nm, 40 nm-60 nm, 60 nm-80 nm, etc.) of the sample. This may be done with the help of a processing module.

In a particular variant, processing comprises the production of a 3-D data stack, preferably with a processing module. This data stack, or the data record produced by the processing module, can preferably be displayed as a three-dimensional image of the sample or of an area of the sample—preferably on a monitor.

The microscope according to the invention preferably exhibits an objective with an objective pupil, whereby the first and/or second and/or the further evanescent field is produced by an illumination light beam that exhibits a focus in the objective pupil area of the objective. The penetration depth of the first and/or of the second and/or of the further evanescent field is adjustable in a preferred variant by adjusting the distance of the focus to the optical axis of the objective. For this purpose, an adjustment mechanism may be provided with which the spatial position of the focus within the objective pupil plane may be changed.

The adjustment mechanism may, for example, comprise a beam deflector with several rotating or wing mirrors, or with a cardanically suspended mirror. The adjustment mechanism may also be implemented as an acousto-optical element, or may comprise a micromirror. A movable light-conducting fiber may also be used to adjust the spatial position of the focus of the illumination light beam.

The angle to the optical axis of the objective at which the illumination light beam that is provided for the evanescent illumination of the sample exits the objective depends on the spatial position of the focus in the objective pupil. The greater the distance of the focus to the optical axis, the greater the angle. Therefore, according to the invention, the distance of the focus to the optical axis of the objective in particular is adjustable, and therewith the penetration depth of the evanescent field in the sample.

In another advantageous variant, the penetration depth is adjusted by adjusting the polarization of the illumination light beam, which produces the first and/or the second and/or the further evanescent field. A phase plate such as a rotatably arranged λ/2 plate may be provided for adjusting polarization.

Advantageously, the microscope is calibrated—independent of the method used to adjust the penetration depth in the sample—, such that it enables reproducible testing and allows for quantitative statements regarding the composition of the sample—in particular regarding the arrangement of the individual sample components within the sample.

Detection preferably ensues with at least one detector that comprises a camera and/or a CCD element and/or an EMCCD element and/or a multiband detector. Preferably, bandpass filters and/or cut-off filters, to which each particular emission bandwidth of the fluorescence signal are attuned, are arranged before the detector. A dispersive element, which produces spectral splitting, may be provided for color selection from which the wavelength portion to be detected may be blocked. The detector may also be implemented as a color detector, for example as a color camera. In the same way, it is possible for a dispersive element to divide the detection light among several detectors in order to achieve spectral detection.

In one variant, the detector is implemented as a pixel detector, and detection comprises pixel-by-pixel scanning of each illuminated part of the sample. For pixel-by-pixel scanning, a further adjustable beam deflector is preferably provided in the beam path of the detection light. In a very particularly preferred embodiment of the invention, the microscope comprises a scanning microscope, in particular a confocal scanning microscope.

The microscope according to the invention preferably exhibits at least one multilinear light source and/or at least one broadband light source. Preferably, the wavelength(s) of the first illumination light beam and/or of the second illumination light beam is/are adjustable. It is possible, according to the invention, for the first illumination light beam and the second illumination light beam as well to comprise light of one or several wavelengths, whereby the wavelength of the first illumination light beam and that of the second illumination light beam can be distinguished from one another.

In a particularly preferred variant, the diameter of the illumination light beam is adjustable. It is particularly advantageous if the aperture angle of an illumination light beam that converges into a single focus in the objective pupil is adjustable. By changing the aperture angle when focusing in the objective pupil, the size of the surface that is evanescently illuminated changes.

BRIEF DESCRIPTION OF THE DRAWINGS

The object of the invention is schematically represented in the diagram, and is described below on the basis of figures, wherein elements that have the same function are given the same reference numbers. They show.

DETAILED DESCRIPTION OF THE PREFERRED EMBODIMENTS

Figure 1:
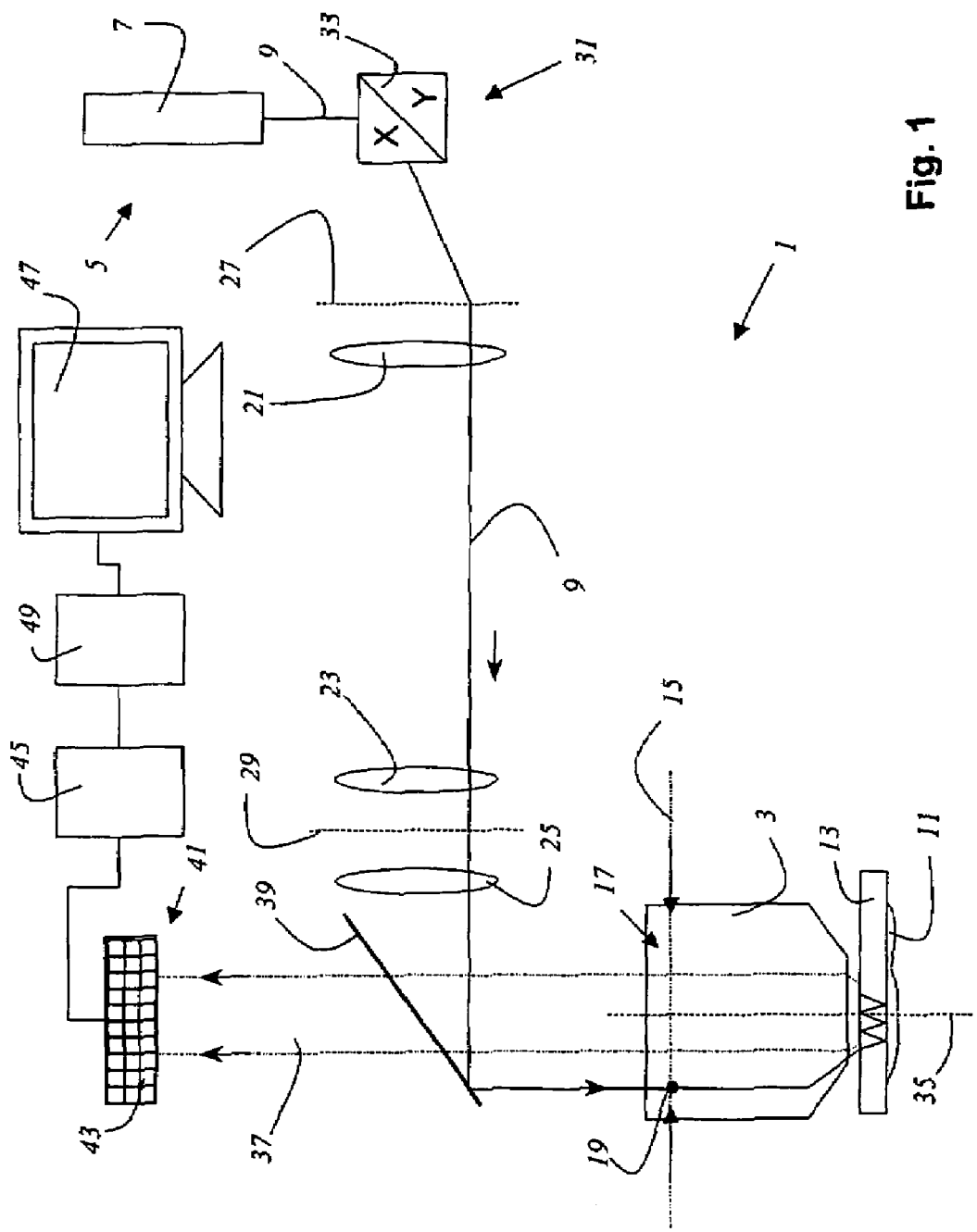
FIG. 1 a microscope according to the invention.

FIG. 1 shows a microscope 1 according to the invention with an objective 3 and a light source 5, which is implemented as a laser 7, and which produces an illumination light beam 9. The illumination light beam 9 emitted by the light source 5 enables evanescent illumination of a sample 11, which is positioned on a sample holder 13. The illumination light beam 9 exhibits a focus 19—which is represented by a point—in the plane 15 of the objective pupil 17. Several optical elements for directing and shaping the beam are located in the beam path of the microscope 1. There may, for example, be a first optic 21, a second optic 23, and an optic 25, which produce a first intermediate image plane 27 and a second intermediate image plane 29. The spatial position of the focus 19 within the plane 15 of the objective pupil 17 may be changed with the help of an adjustment mechanism 31, which comprises an adjustable beam deflector 33. The adjustable beam deflector 33 comprises a cardanically suspended rotating mirror, which is not shown. The distance of the focus 19 to the optical axis 35 of the objective 33 may be adjusted, and therewith the penetration depth of the illumination light beam in the sample 11 varied, using the adjustment mechanism 31. The detection light 37, which exits from the sample 11, passes through the objective 3 as well as through the beam splitter 39, which directs the illumination light beam 9 to the objective 3, and through it to a detector 41, which is implemented as a CCD camera. The beam splitter 39 is implemented as a dichroic beam splitter, and is designed such that light of the wavelength of the illumination light beam is reflected, whereas light of the wavelength of the detection light 37 may pass through.

Firstly, a first distance of the focus of the illumination light beam 9 to the optical axis 35 is selected, and therewith a first penetration depth of a first evanescent field. There then ensues detection of the first detection light that exits from the part of the sample 11 that is illuminated with the first evanescent field, and the production of first detection light data. The first detection light data are transmitted to a processing module 45. Then the distance of the focus of the illumination light beam 9 to the optical axis 35 is enlarged, thereby producing a second evanescent field that exhibits a second penetration depth in the sample that is greater than the first penetration depth. There then ensues detection of the second detection light that exits from the part of the sample 11, which is illuminated with the second evanescent field, and the production of second detection light data. The second detection light data are also transmitted to the processing module 45. Correlation of image objects with various layer depths of the sample from the first and the second detection light data ensues in the processing module 45, and a 3-D data stack is produced, which is displayed as a three-dimensional image of the sample or of the illuminated area of the sample on a monitor 47 of a PC 49.

Figure 2:
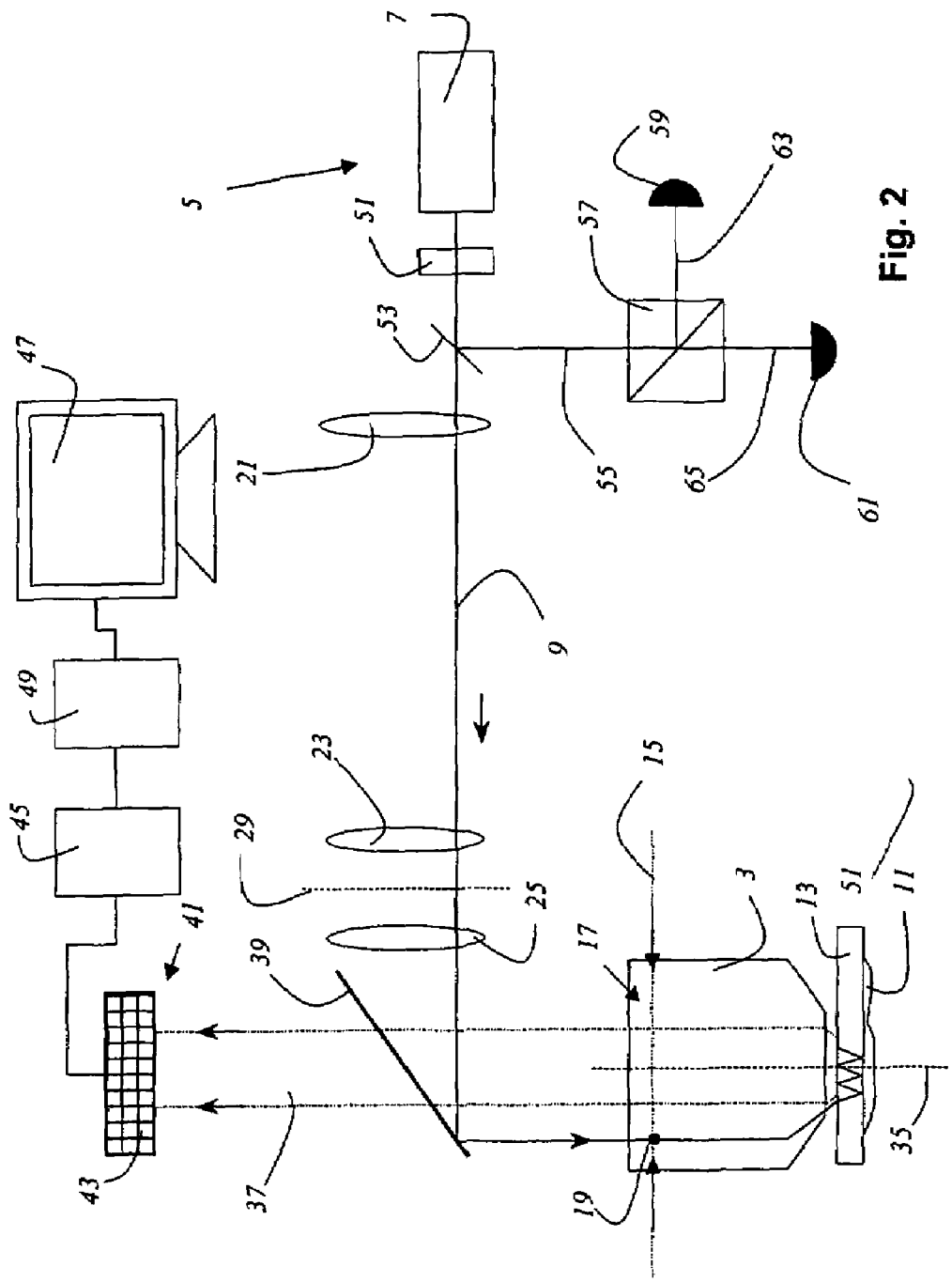
FIG. 2 a further microscope according to the invention.

FIG. 2 shows a microscope according to the invention in which adjustment of the penetration depth of the first and/or of the second and/or of the further evanescent field is accomplished by adjusting the polarization of the illumination light beam. A rotatable λ/2 plate 51, with which the polarization direction of the illumination light beam 9 can be rotated, is arranged in the beam path of the illumination light beam 9. In order to monitor the adjusted polarization, a beam splitter 53 is arranged in the further beam path of the illumination light beam 9, which splits off a small part of the illumination light beam 9 as a test beam 55 to check polarization. The test beam 55 is split by a polarization beam splitter 57 into an s-polarized partial beam 63, which is detected by a first detector 59, and a p-polarized partial beam 65, which is detected by a second detector 61. Conclusions may be drawn about the polarization of the illumination light beam 9 from the ratio of the light power measured by the first detector 59 and by the second detector 61. The rotational position of the λ/2 plate 51 is adjusted by information fed into a closed-loop control system (not shown) by the user.

Figure 3:
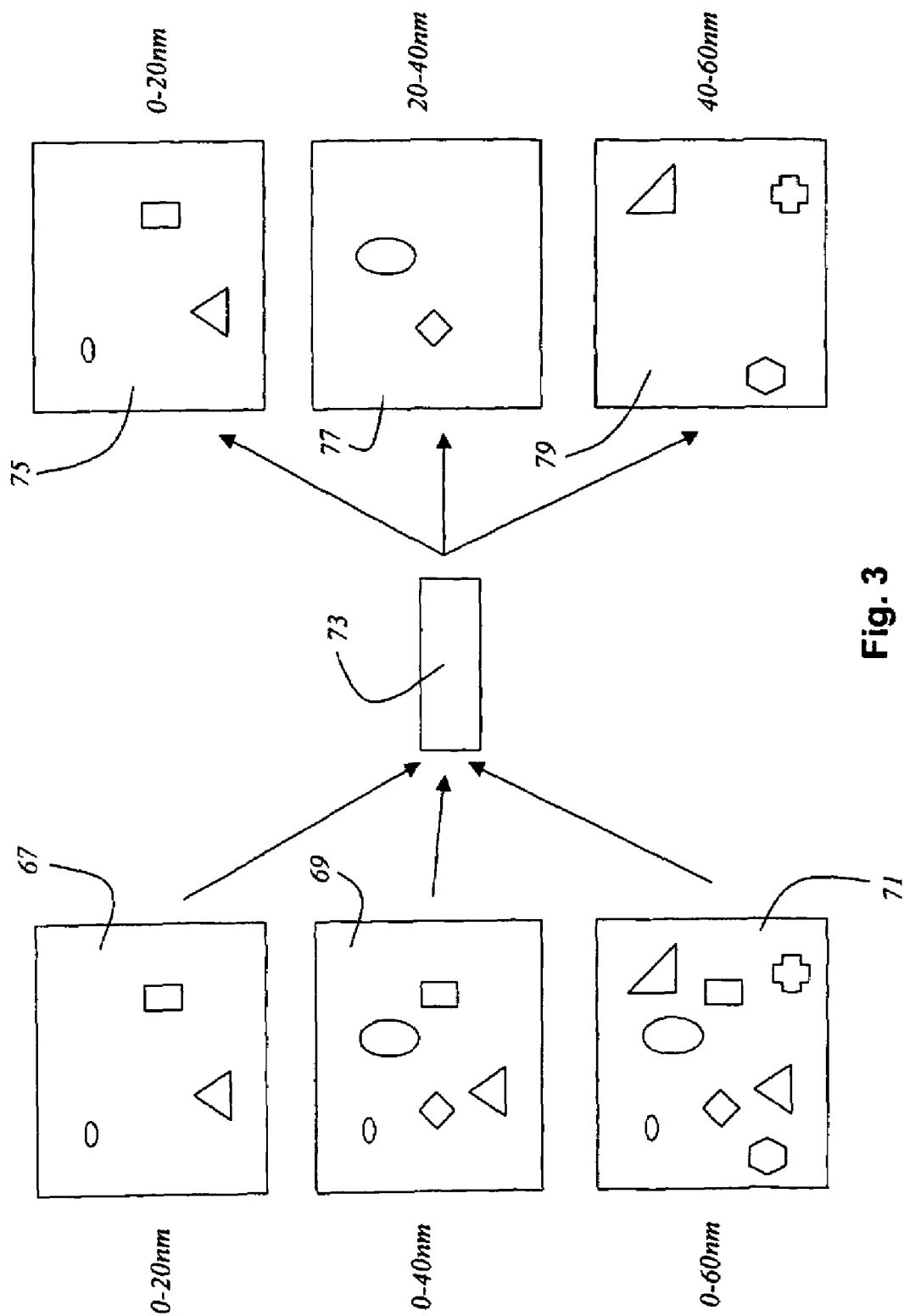
FIG. 3 an illustration of the method according to the invention.

FIG. 3 illustrates the method according to the invention. Firstly, the sample is illuminated with a first evanescent field at a penetration depth of 20 nm, for example, and the first detection light for producing the first detection light data 67 is detected. The first detection light data comprise 3 image objects in this example. Then the sample is illuminated with a second evanescent field at a penetration depth of 40 nm, for example, and the second detection light for producing the second detection light data 69 is detected. The second detection light data comprise 5 image objects in this example, of which 3 are known from the first detection light data. Then the sample is illuminated with a further evanescent field at a penetration depth of 60 nm, for example, and the further detection light for producing the further detection light data 71 is detected. The further detection light data comprise 8 image objects in this example, of which 5 are already known from the first detection light data and the second detection light data. There then ensues processing 73 of the first, second, and further detection light data. Processing comprises correlation of which image objects belong with the first set of sample layer data 75 (0-20 nm), which with the second set of sample layer data 77 (20-40 nm), and which with the third set of sample layer data 79 (40-60 nm). The data are stored as a 3-D data stack and may, for example, be displayed by the user on a monitor.

The invention was described in relation to a particular embodiment. However, it is clear that changes and variations may be implemented without abandoning the scope of the following claims.

What is claimed is:

1. A method for microscopically testing a sample, comprising:
    illuminating the sample with a first evanescent field to a first penetration depth of the sample;
    detecting a first detection light exiting from a part of the sample illuminated with the first evanescent field to produce first detection light data comprising imaging of objects within the first penetration depth of the sample;
    illuminating the sample with a second evanescent field to a second penetration depth of the sample that is greater than the first penetration depth;
    detecting a second detection light exiting from a part of the sample illuminated with the second evanescent field to produce second detection light data comprising imaging of objects within the second penetration depth of the sample; and
    correlating the first and the second detection light data and subtracting the first detection light data from the second detection light data to produce displayable three-dimensional imaging of objects within the sample.

2. The method according to claim 1, further comprising:
    illuminating the sample with one or several additional evanescent fields of differing penetration depth; and
    detecting additional detection light exiting from part(s) of the sample illuminated with the additional evanescent field(s) to produce additional detection light data;
    processing the first, the second, and the additional detection light data.

3. The method according to claim 1, wherein illumination is accomplished through an objective of a microscope, further comprising producing the first or the second or an additional evanescent field by an illumination light beam with a focus in an objective pupil plane of the objective.

4. The method according to claim 3, further comprising adjusting the penetration depth of the first or of the second or of the additional evanescent field by adjusting a distance of the focus to an optical axis of the objective.

5. The method according to claim 4, further comprising moving by an adjustment mechanism of the focus within the objective pupil plane.

6. The method according to claim 5, wherein the adjustment mechanism comprises an adjustable beam deflector in a beam path of the illumination light beam.

7. The method according to claim 4, further comprising adjusting the penetration depth of the first or of the second or of the additional evanescent field by adjusting polarization of the illumination light beam.

8. The method according to claim 1, wherein the detection is accomplished by at least one detector comprising a camera or a CCD element or an EMCCD element.

9. The method according to claim 1, wherein the detection comprises pixel-by-pixel scanning of each illuminated part of the sample.

10. A microscope with evanescent sample illumination, comprising:
- a first evanescent field having a first penetration depth in the sample, and
- a second evanescent field having a second penetration depth in the sample, which is greater than the first penetration depth,
- at least one detector
  - detecting the first detection light exiting a part of the sample illuminated with the first evanescent field and producing first detection light data comprising imaging of objects within the first penetration depth of the sample and
  - detecting the second detection light exiting a part of the sample illuminated with the second evanescent field and producing second detection light data comprising imaging of objects within the second penetration depth of the sample, and
- a processing module correlating the first and the second detection light data and subtracting the first detection light data from the second detection light data to produce displayable three-dimensional imaging of objects within the sample.

11. The microscope according to claim 10, further comprising additional evanescent fields with differing penetration depths; wherein the detector detects additional detection light exiting part(s) of the sample illuminated with the additional evanescent field(s), and produces additional detection light data, which are processed with the processing module.

12. The microscope according to claim 10, further comprising an objective with an objective pupil plane, wherein the first or the second or an additional evanescent field is produced by an illumination light beam with a focus in the objective pupil plane of the objective.

13. The microscope according to claim 12, wherein the penetration depth of the first or of the second or of the additional evanescent field is adjusted by adjusting a distance of the focus to an optical axis of the objective.

14. The microscope according to claim 13, further comprising an adjustment mechanism changing a spatial position of the focus within the objective pupil plane.

15. The microscope according to claim 14, wherein the adjustment mechanism comprises an adjustable beam deflector in a beam path of the illumination light beam.

16. The microscope according to claim 12, wherein the penetration depth of the first or of the second or of the additional evanescent field is adjustable by adjusting a polarization of the illumination light beam.

17. The microscope according to claim 16, further comprising a phase plate to adjust the polarization.

18. The microscope according to claim 10, wherein the detector comprises a camera and/or a CCD element or an EMCCD element.

19. The microscope according to claim 10, wherein the detector is a pixel detector, and wherein the detecting comprises pixel-by-pixel scanning of each illuminated part of the sample.

20. The microscope according to claim 19, further comprising an adjustable beam deflector in a beam path of the detection light.

* * * * *